June 5, 1923.
E. E. GARRETT
CHAIN
Filed Nov. 6, 1922
1,458,096
Fig. 1.
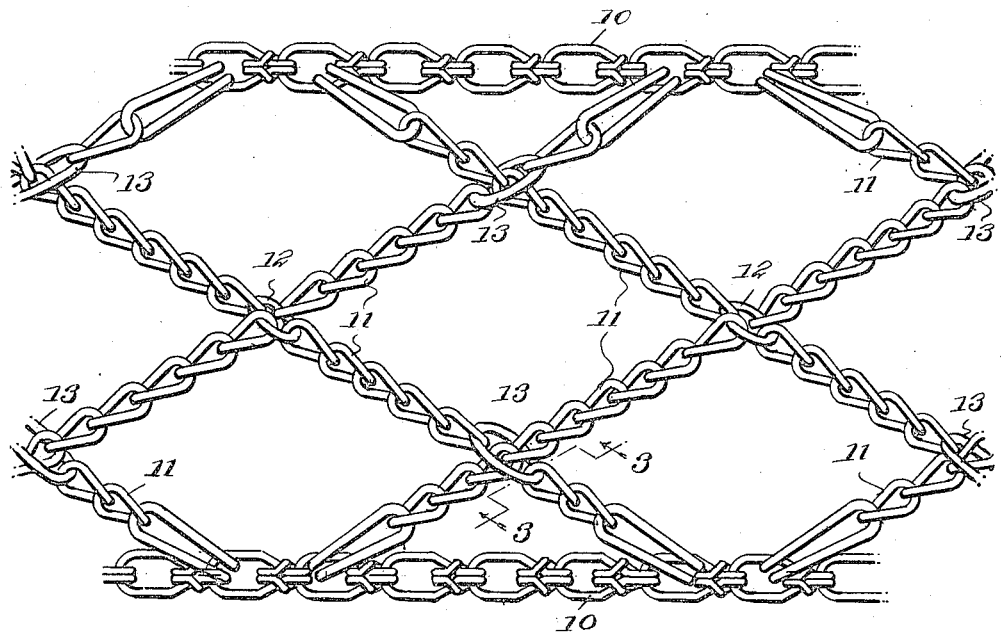
Fig. 2.
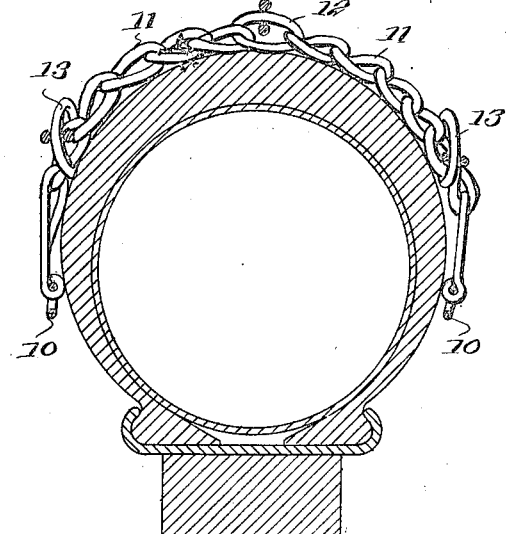
Fig. 3.
E. E. Garrett
INVENTOR
BY Victor J. Evans
ATTORNEY
WITNESS:

Patented June 5, 1923.

1,458,096

UNITED STATES PATENT OFFICE.

EMERSON E. GARRETT, OF WALLACE, WEST VIRGINIA.

CHAIN.

Application filed November 6, 1922. Serial No. 599,341.

*To all whom it may concern:*

Be it known that I, EMERSON E. GARRETT, a citizen of the United States, residing at Wallace, in the county of Harrison and State of West Virginia, have invented new and useful Improvements in Chains, of which the following is a specification.

This invention relates to improvements in non-skid chains for vehicle wheels.

An object of the invention is the provision of a non-skid chain which includes side chains connected by crossed chains, the latter being arranged to provide a plurality of diamond shaped figures to insure an effective grip and at the same time permit of relative movement of the crossed chains to allow for displacement of air during the use of a pneumatic tire.

With the above and other objects in view, the invention further includes the following novel features and details of construction, to be hereinafter more fully described, illustrated in the accompanying drawings and pointed out in the appended claim.

In the drawings:—

Figure 1 is a plan view of a non-skid chain constructed in accordance with the invention.

Figure 2 is a section taken transversely of a pneumatic tire with the chain applied thereto.

Figure 3 is an enlarged sectional view on the line 3—3 of Figure 1.

Referring in detail to the drawings, wherein like characters of reference denote corresponding parts, the reference character 10 indicates the side chains of a non-skid tire chain, the said side chains being connected by spaced diagonally arranged crossed chains 11, the said chains crossing at a plurality of points and being connected to one another at their points of crossing.

The side and crossed chains may be of any suitable character and the latter are arranged so as to provide a plurality of diamond-shaped figures disposed between the former. The chains 11 are positively connected at their central points of crossing as shown at 12, that is, the links of the crossed chains are connected to one another at this point. At the points of crossing of the chains 11 upon opposite sides of the positive connection 12, the said chains are connected in a manner to permit of relative sliding movement upon one another and for this purpose each of the chains 11 has included therein at a point adjacent the side chains 10, a relatively large substantially oval link 13 which receives the adjacent portion of another crossed chain, so that each of the chains 11 includes one of the links 13 which is located at a point adjacent one of the side chains 10 and has its opposite end passed through a similar link included in another of the crossed chains 11 which is located adjacent the opposite side chain 10. The chains 11 are thus substantially interwoven with one another and are so arranged as to resist any tendency of a vehicle wheel to either side or forward skid. At the same time, the links 13 permit sufficient movement or play between the chains 11 to allow for the usual displacement of air incident to the use of a pneumatic tire.

The invention is susceptible of various changes in its form, proportions and minor details of construction and the right is herein reserved to make such changes as properly fall within the scope of the appended claim.

Having described the invention what is claimed is:—

A non-skid chain embodying side chains, diagonally arranged oppositely disposed crossed chains connecting the side chains and arranged in substantially diamond-shaped formation, said crossed chains meeting at spaced points, means for positively connecting the crossed chains at their central meeting points and means connecting said crossed chains at points upon opposite sides of their positively connected points to permit of relative movement upon one another.

In testimony whereof I affix my signature.

EMERSON E. GARRETT.